United States Patent
Reau et al.

(10) Patent No.: US 6,812,403 B2
(45) Date of Patent: Nov. 2, 2004

(54) PREWIRING DEVICE IN A WIRING INSTALLATION AND METHOD USING SAME

(75) Inventors: Anne-Cecile Reau, Pleumeur-Bodou (FR); Alain Petit, Pluzunet (FR); Daniel Lecoq, Berhet (FR); Jean-Jacques Gueguen, Saint Quay Perros (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/363,114

(22) PCT Filed: Aug. 29, 2001

(86) PCT No.: PCT/FR01/02693

§ 371 (c)(1),
(2), (4) Date: Sep. 22, 2003

(87) PCT Pub. No.: WO02/19490

PCT Pub. Date: Mar. 7, 2002

(65) Prior Publication Data

US 2004/0069519 A1 Apr. 15, 2004

(30) Foreign Application Priority Data

Sep. 1, 2000 (FR) .......................................... 00 11175

(51) Int. Cl.⁷ ................................................ H05K 5/00
(52) U.S. Cl. .............................. 174/50; 174/58; 174/60; 220/4.02
(58) Field of Search ............................. 174/48, 50, 58, 174/60; 220/4.02, 3.6, 3.8; 361/600; 248/906; 439/535

(56) References Cited

U.S. PATENT DOCUMENTS

| | | |
|---|---|---|
| 3,689,031 A | 9/1972 | Ruddick |
| 4,902,853 A | 2/1990 | Elluin |
| 5,231,687 A * | 7/1993 | Handley ...................... 385/139 |
| 5,693,908 A * | 12/1997 | Amberger .................... 174/48 |

FOREIGN PATENT DOCUMENTS

DE 295 21 454 5/1997

* cited by examiner

*Primary Examiner*—Dhiru R Patel
(74) *Attorney, Agent, or Firm*—Cohen, Pontani, Lieberman & Pavane

(57) ABSTRACT

A precabling device in a cabling installation having, inside the installation, at least one stowage module (50) and a plurality of precabling tubes (40) for receiving cables (10). Each of the precabling tubes is fixed to the stowage module (50) in the vicinity of an end (41) thereof.

9 Claims, 3 Drawing Sheets

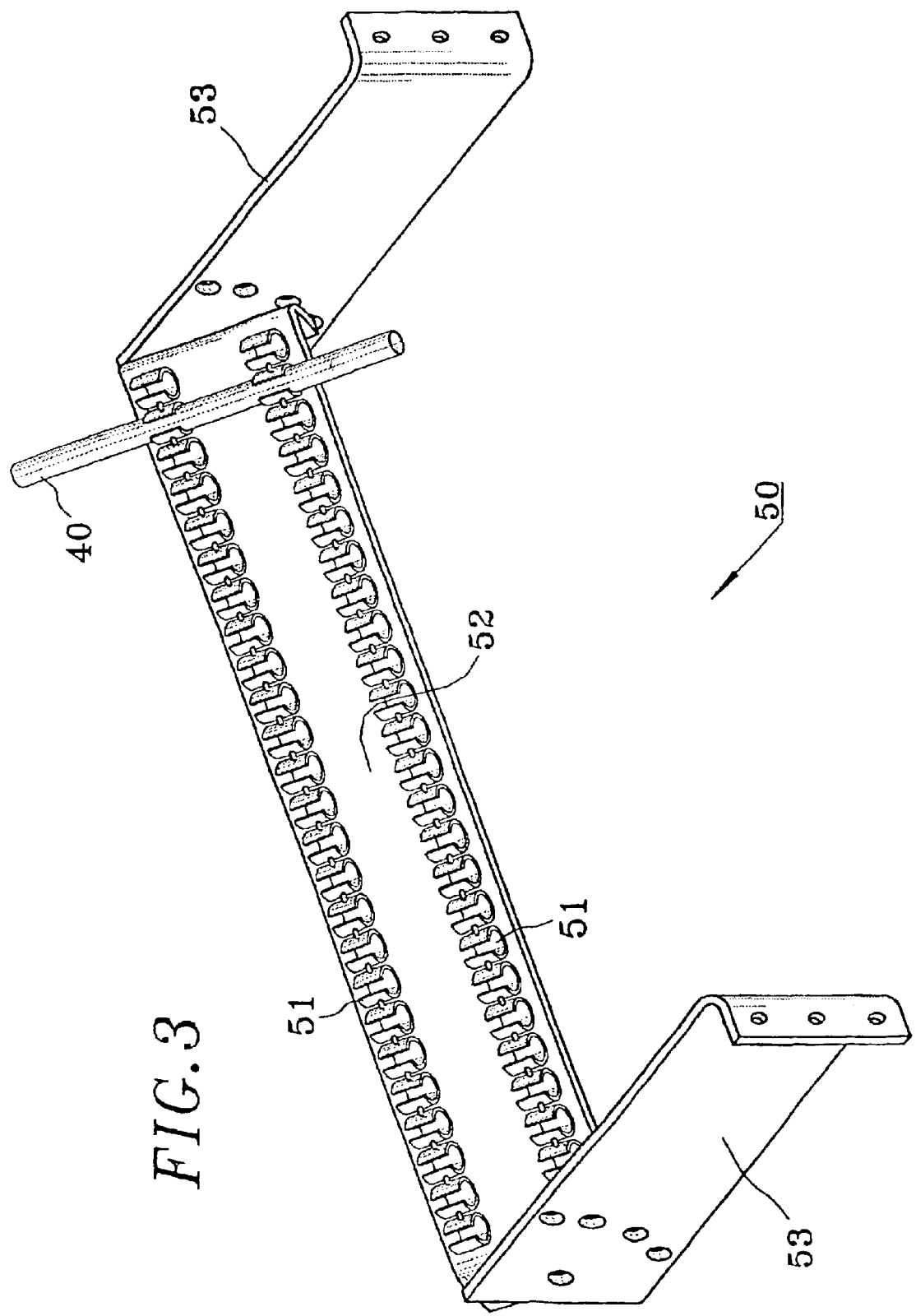

PREWIRING DEVICE IN A WIRING INSTALLATION AND METHOD USING SAME

This is a U.S. National Phase Application under 35 USC 371 of International Application PCT/FR01/02693, filed on Aug. 29, 2001.

FIELD OF THE INVENTION

The present invention relates to a precabling device in a cabling installation. It also relates to a method of implementing said precabling device.

A particularly advantageous application of the invention lies in the field of precabling buildings by means of precabling tubes.

BACKGROUND OF THE INVENTION

In general manner, a building is wired using thoroughly standardized infrastructure (EN 50173-ISO 11801). A general distribution frame, usually situated in the basement of the building, distributes vertical cables to floor distribution frames or sub-distribution frames, using service ducts. Thereafter, the floor distribution frames serve a plurality of office access points by means of "horizontal" cabling. Thus, the general distribution frame is the point where public network cables are connected to vertical cables, while floor distribution frames receive vertical cables and horizontal cables, together with bypass cables and shared network equipments.

In practice, access points at floor distribution frames are connected in cabling installations, for example in cabling bays. A cabling bay is a structure of standardized dimensions. It may be enclosed by means of a door and partitions, in which case it is referred to as a "cabinet".

A cabling bay is fitted with a plurality of cross-connect panels, some of which constitute arrival points for vertical cables, while others represent departure points for horizontal cables going to access points. In order to share a piece of equipment over a plurality of access points, jumpers, e.g. having single optical fibers, are positioned in such a manner as to interconnect the various cross-connect panels (shelves, drawers, . . . ).

Whether performing precabling or cabling, all of the cross-connect panels are in position in the bay and all of the horizontal cables are previously stowed at the bottom of the bay behind the panels. The bay is then ready for the installer to proceed. The cabling in the bay is fixed and the connections to the equipment drawers are made without difficulty as and when required by cross-connect jumpers passing over the front face of the bay.

The drawback of that precabling or cabling method is that all of the cross-connect panels and all of the horizontal cables must be installed at the beginning of installation, i.e. before actually being used, and that represents a significant cost tied-up in hardware.

To remedy that drawback, it is possible to implement precabling by means of tubes. The installation is thus equipped in two stages: in an initial stage, it receives all of the precabling tubes which are stowed so as to be ready on the cross-connect panels, and then in a second stage, the cables are installed progressively to meet requirements by being blown along the precabling tubes. The advantage of that method is that it does not require all of the cables to be put into place initially, thus reducing initial installation costs. However, the cabling installation must itself be equipped from the beginning with all of the cross-connect panels, which nevertheless involves high levels of investment and overdimensioning of the installation since real requirements are not known a priori, given that cabling is performed as and when requested. Furthermore, in order to be able to install cables progressively in the installation by means of blowing, access must be available to the precabling tubes on a permanent basis, even though they are already stowed to the backs of the cross-connect panels. It is therefore necessary to provide special drawers, e.g. of the slideway type, which makes the installation more expensive. Furthermore, slideway drawers are not suitable for tubes that present some degree of stiffness and/or that are of large diameter (e.g. 8 millimeters (mm) outside diameter) since the bundle of tubes then runs the risk of preventing the drawers from moving. The tubes can also be injured or pinched, which makes them unsuitable for use in subsequent blowing operations. Furthermore, having the precabling tubes pre-stowed to the cross-connect panels leads to a lack of flexibility in the management of cables since the number of outlet connectors on a panel is fixed to some maximum value (e.g. 24), and the number of empty tubes is also fixed even though the number of fibers per tube may vary (e.g. in the range 1 to 8). Finally, the initial cost of the installation remains high since it is necessary to install all of the cross-connect panels at the same time as the precabling tubes. This is particularly true when the cabling installation is not accessible from its rear face as is generally the case in old buildings.

SUMMARY OF THE INVENTION

One object of the present invention is to provide a precabling device in a cabling installation that makes it possible to remedy the drawbacks presented by the known method of precabling by means of tubes, in particular the high initial investment cost due to prior installation of all of the cross-connect panels.

This and other objects are attained in accordance with one aspect of the present invention directed to a precabling device in a cabling installation, the device being characterized in that it comprises, inside said installation, at least one stowage module and a plurality of precabling tubes for receiving cables, each of said precabling tubes being fixed to the stowage module in the vicinity of an end thereof.

Thus, the precabling device of the invention makes it possible to organize the cabling installation in a manner that is different in that the precabling tubes can be managed independently of the cables or of the cross-connect panels. As explained in greater detail below, the invention makes it possible to install the precabling tubes in the installation without it being necessary to invest in the cross-connect panels beforehand. The cables are taken to the cross-connect panels that are purchased to match demand, thus providing optimum utilization of the panels in terms of cost.

The invention thus makes it easier to manage tubes and cabling, and also facilitates the blowing operation when, advantageously, said precabling tubes are blow tubes.

The precabling device of the invention is implemented by means of a method, which, according to the invention, comprises the steps consisting in:

putting a cross-connect panel into place in the cabling installation;

inserting a cable into one of said precabling tubes through said end fixed to the stowage module; and connecting said cable to the cross-connect panel.

In a particular implementation of the method of the invention, said cable is inserted by blowing in a blow tube.

In an advantageous variant embodiment, the precabling device of the invention also comprises at least one second stowage module to which each connection tube is fixed in the vicinity of a first end thereof.

Under such circumstances, in accordance with the invention, provision is made for the step of connecting said cable to the cross-connect panel to comprise a first step consisting in introducing the cable into a connection tube through said first end and in fixing said connection tube to the cross-connect panel via a second end. The cable is inserted merely by being pushed in manually, for example.

BRIEF DESCRIPTION OF THE DRAWINGS

The following description with reference to the accompanying drawings, given as non-limiting examples, makes it easy to understand what the invention consists in and how it can be implemented.

FIG. 3 is a perspective view of a stowage module as shown in FIGS. 1 and 2.

Figure 1:
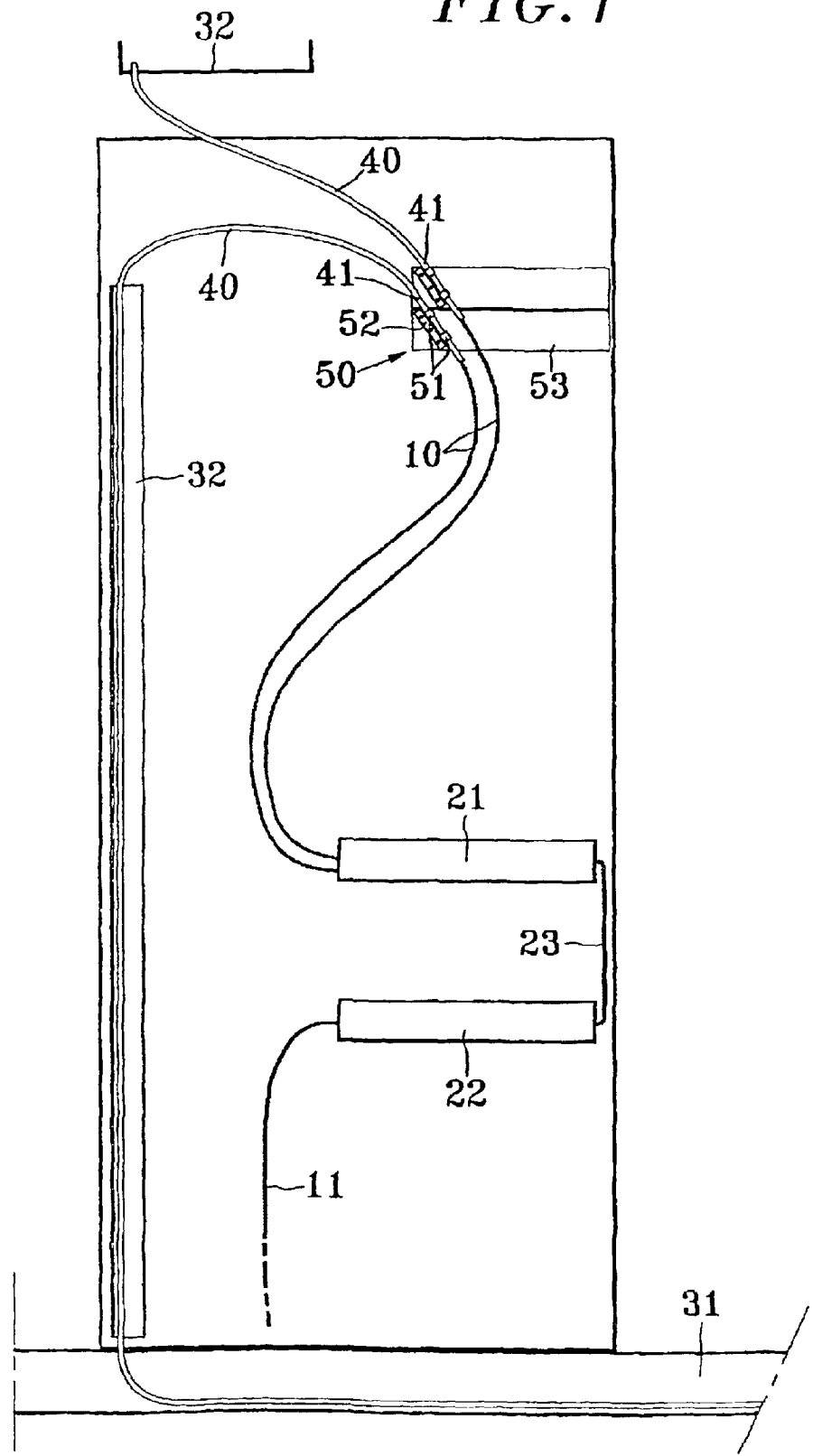
FIG. 1 is a side view of a cabling bay provided with a precabling device in accordance with the invention.

The cabling installation shown in FIG. 1, in this case a cabling bay, constitutes by way of example a floor distribution frame for a building, for drawing distribution cables 10, in particular optical fiber cables referred to as "horizontal" cables between at least one cross-connect panel 21 (a drawer or a shelf) and various access points of the floor under raised floors 31 and/or on cable trays 32. The cross-connect panel 21 is connected by a jumper 23 occupying the front face of the bay to an equipment drawer 22.

In the embodiment of FIG. 1, cabling is performed by means of a plurality of precabling tubes 40 which are initially put into place inside the bay to serve the various access points by passing under the raised floors 31 and on the cable trays 32. The precabling tubes 40 are to receive distribution cables 10, which cables are inserted into the tubes 40 as and when required.

As can be seen in FIG. 1, the cabling bay is fitted with a precabling device which in this case comprises, in addition to the precabling tubes 40, two stowage modules 50 to which each of said tubes 40 is fixed in the vicinity of one end 41.

DETAILED DESCRIPTION OF THE DRAWINGS

FIG. 3 shows a particular embodiment of a stowage module 50 comprising a support plate 52 which is fixed to the vertical uprights of the cabling bay by connection brackets 53. The support plate 52 is inclined so as to limit the bending of the precabling tubes which are stowed thereon using two rows of quick-fixing means 51 that respond merely to manual pressure, e.g. means of the clip-fastener type. These means 51 are used in pairs to ensure that the tubes do not move while the cables are being inserted.

During installation of the bay, all of the precabling tubes 40 are put into place on the stowage module(s) 50 so as to be ready for subsequent use. Thereafter, in the method of the invention, a first cross-connect panel 21 is put into place in the cabling bay. A distribution cable 10 is then inserted in at least one of the precabling tubes 40 via the end 41 of the tube that is fixed to the stowage module 50. Finally, the cable 10 is connected to the back of the cross-connect panel 21 and the jumper 23 is put into position between the panel 21 and the equipment drawer 22. The distribution cables 10 are thus installed progressively as a function of demand, and the same applies to the cross-connect panels 21.

The invention is particularly suited to blow-laying distribution cables 10. Under such circumstances, provision is made for the precabling tubes 40 to be blow tubes and for the cables to be inserted by being blown along one of said blow tubes.

It should be observed that the stowage modules 50 give access to all of the tubes 40 from the front face of the bay, thus making the blowing operation easier to perform. Likewise, the blown cables 10 are taken to the panel 21 via paths that are always accessible.

FIG. 3 shows that the stowage modules 50 allow a very large number of precabling tubes 40 to be held. The number of modules 50 is adapted as a function of the number of tubes required for cabling. In order to make the precabling device of the invention even more economical, it is preferable not to fit the stowage modules with the compressed air couplings that are needed for blowing cables.

Figure 2:
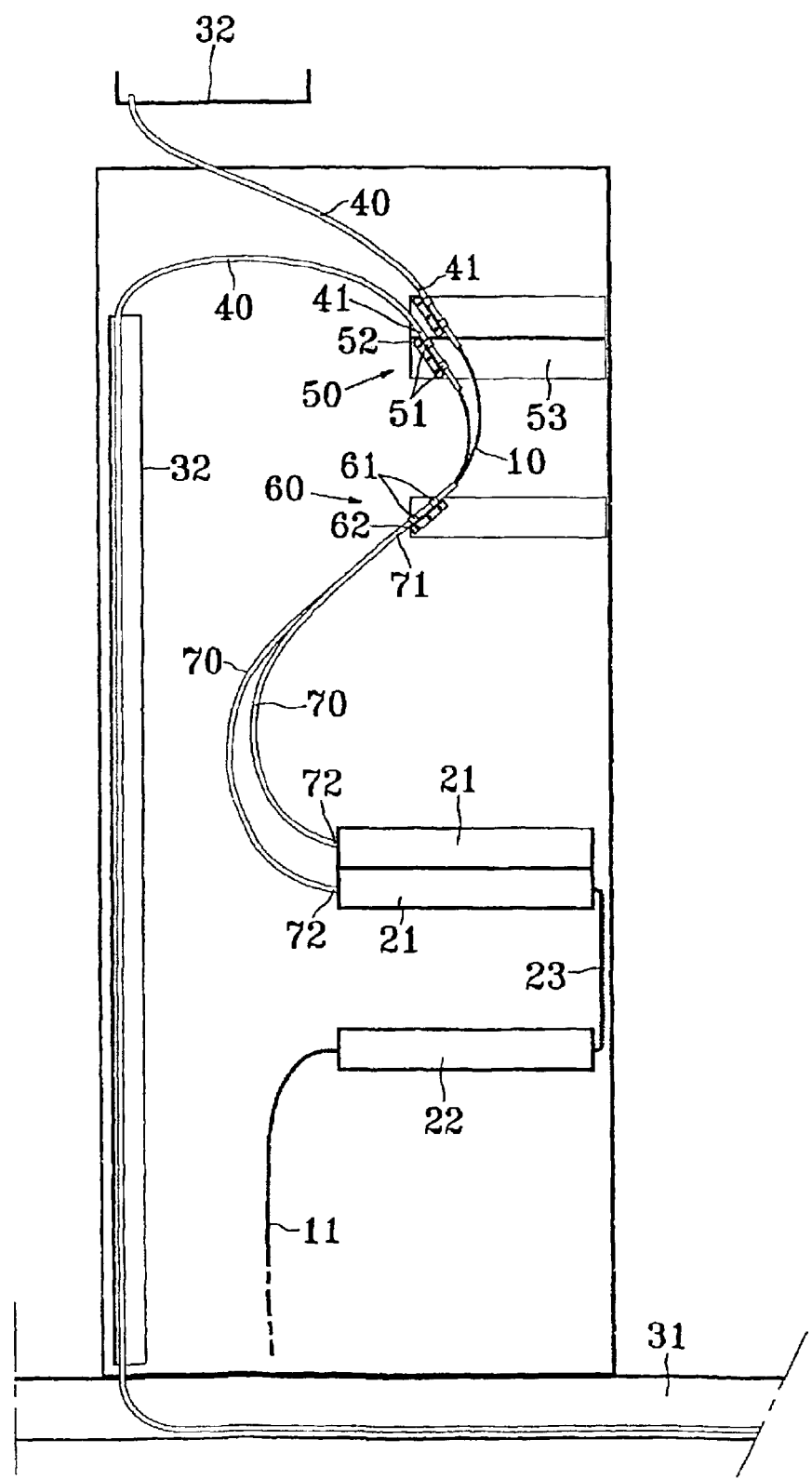
FIG. 2 shows the FIG. 1 cabling bay also provided with a stowage module for connection tubes.

FIG. 2 shows a second stowage module 60 to which connection tubes 70 are fixed in the vicinity of a first end 71. The stowage module 60 may be identical to the stowage module 50 shown in FIG. 3, presenting quick-fixing means 61, e.g. clip-fastening means for retaining the connection tubes 70.

Said connection tubes 70 serve to protect the distribution cables 10, in particular blow cables which are particularly fragile where they extend between the outlet from the precabling tubes 40 and the cross-connect panels 21. For this purpose, after a cable 10 has been blown into a tube 40, it is inserted under manual thrust into a connection tube 70 through the first end 71 fixed to the second stowage module 60, and said connection tube 70 is itself fixed to the cross-connect panel 21 via a second end 72. The cable 10 is then connected to the panel 21.

What is claimed is:

1. A method of cabling in a cabling installation, comprising:

putting at least one stowage module (50) into place in said cabling installation, the stowage module being provided with fixing means (51);

fixing a plurality of precabling tubes (40) to said stowage module with said fixing means (51), each of said precabling tubes being fixed in the vicinity of an end (41) thereof;

putting a cross-connect panel (21) into place in the cabling installation;

after said plurality of precabling tubes have been fixed to said stowage module, inserting one end of a cable (10) into one of said precabling tubes (40) via the end (41) of said precabling tube that is fixed to the stowage module (50); and connecting another end of said cable to the cross-connect panel (21).

2. A method of cabling according to claim 1, wherein said cable (10) is inserted into a blow tube by blowing.

3. A cabling method according to claim 1, wherein the step of connecting said cable (10) to the cross-connect panel (21) comprises:

putting a second stowage module (60) into place in the cabling installation, said second stowage module being provided with second fixing means (61), fixing a plurality of connection tubes (70) to said second fixing means (61), each of said connection tubes (70) being fixed in the vicinity of a first end (71) thereof, inserting said cable (10) into a connection tube (70) via said first end (71), and fixing a second end (72) of said connection tube (70) to said cross-connect panel (21).

4. A cabling method according to claim 3, wherein said cable (10) is inserted into the connection tube (70) by being pushed in manually.

5. A precabling device for implementing the cabling method according to claim 1, the device comprising:

said at least one stowage module (50) provided with said fixing means (51);

a plurality of said precabling tubes (40) for receiving said cables (10), each of said precabling tubes being fixed to said stowage module with said fixing means (51) in the vicinity of said end (41) thereof; and said cross-connect panel (21) to which said cables (10) are connected.

6. A precabling device according to claim 5, wherein said fixing means (51) comprise quick-fixing means for fixing said precabling tubes (40).

7. A precabling device according to claim 5, wherein said precabling tubes (40) are blow tubes.

8. A precabling device according to claim 5, further comprising at least one second stowage module (60) to which said connection tubes (70) are fixed, each of said connection tubes being fixed in the vicinity of a first end (71) thereof.

9. A precabling device according to claim 8, wherein said second stowage module (60) comprises quick-fixing means (61) for fixing said connection tubes (70).

* * * * *